United States Patent
Hao

(10) Patent No.: US 10,201,023 B2
(45) Date of Patent: Feb. 5, 2019

(54) ESTABLISHING A LOCAL CONNECTION IN A ROAMING LOCATION

(71) Applicant: Lenovo (Beijing) Limited, Beijing (CN)

(72) Inventor: Zhuangzhuang Hao, Beijing (CN)

(73) Assignee: LENOVO (Beijing) LIMITED, Beijing (CN)

( * ) Notice: Subject to any disclaimer, the term of this patent is extended or adjusted under 35 U.S.C. 154(b) by 128 days.

(21) Appl. No.: 15/085,163

(22) Filed: Mar. 30, 2016

(65) Prior Publication Data

US 2017/0196027 A1   Jul. 6, 2017

(30) Foreign Application Priority Data

Dec. 30, 2015  (CN) .......................... 2015 1 1021187
Dec. 30, 2015  (CN) .......................... 2015 1 1021491

(51) Int. Cl.
*H04W 76/10* (2018.01)
*H04W 12/06* (2009.01)
(Continued)

(52) U.S. Cl.
CPC ............. *H04W 76/10* (2018.02); *H04W 8/12* (2013.01); *H04W 12/06* (2013.01); *H04W 60/00* (2013.01)

(58) Field of Classification Search
CPC ..... H04W 12/06; H04W 12/08; H04W 88/06; H04W 36/14; H04W 48/16; H04W 88/16; H04W 48/18; H04W 76/02; H04W 88/02; H04W 12/04; H04W 36/0022; H04W 4/001; H04W 4/14; H04W 60/00; H04W 60/04; H04W 72/04; H04W 76/022; H04W 48/04; H04W 4/021; H04W 4/24; (Continued)

(56) References Cited

U.S. PATENT DOCUMENTS

2009/0270098 A1    10/2009  Gallagher et al.
2010/0290403 A1*   11/2010  Lindholm ............... H04W 8/06
                                                              370/328
(Continued)

FOREIGN PATENT DOCUMENTS

CN      1669278 A       9/2005
CN    101437271 A       5/2009
(Continued)

*Primary Examiner* — George Eng
*Assistant Examiner* — Jing Gao
(74) *Attorney, Agent, or Firm* — Kunzler, PC

(57) ABSTRACT

Disclosed are apparatuses, methods, systems, and program products for establishing a local connection in a roaming location. The communication method is applied in a mobile communication device, wherein the mobile communication device is able to perform a service transmission in a circuit switched domain within a first communication network. The communication method includes detecting a user terminal at a roaming location, obtaining user identity information over a first communication network of a home location and a second communication network of the roaming location, registering the user identity information with the second communication network of the roaming location, and establishing a localized connection between the user terminal and the second communication network based on the registered user identity information.

20 Claims, 4 Drawing Sheets

(51) Int. Cl.
*H04W 60/00* (2009.01)
*H04W 8/12* (2009.01)

(58) Field of Classification Search
CPC ............ H04W 28/22; H04W 36/0011; H04W 36/0033; H04W 36/22; H04W 8/20; H04L 12/1407; H04L 65/1016; H04L 65/1069; H04L 9/3271; H04M 15/7556; H04M 15/8235
See application file for complete search history.

(56) References Cited

U.S. PATENT DOCUMENTS

| | | | |
|---|---|---|---|
| 2010/0311402 A1* | 12/2010 | Srinivasan | H04W 8/183 455/418 |
| 2011/0286443 A1 | 11/2011 | Wu et al. | |
| 2015/0057044 A1* | 2/2015 | Altman | H04W 4/003 455/558 |
| 2015/0304506 A1* | 10/2015 | Zhu | H04M 15/49 455/406 |

FOREIGN PATENT DOCUMENTS

| | | |
|---|---|---|
| CN | 103686669 A | 3/2014 |
| CN | 103987024 A | 8/2014 |
| CN | 104365149 A | 2/2015 |
| CN | 104581684 A | 4/2015 |
| CN | 104618882 A | 5/2015 |
| CN | 105101167 A | 11/2015 |
| CN | 105163305 A | 12/2015 |

\* cited by examiner

ESTABLISHING A LOCAL CONNECTION IN A ROAMING LOCATION

CROSS-REFERENCE TO RELATED APPLICATIONS

This patent application claims priority to People's Republic of China Patent Application No. 201511021187.4 filed on Dec. 30, 2015, for Zhuangzhuang Hao, the entire contents of which are incorporated herein by reference for all purposes, and People's Republic of China Patent Application No. 201511021491.9 filed on Dec. 30, 2015, for Zhuangzhuang Hao, the entire contents of which are incorporated herein by reference for all purposes.

FIELD

The subject matter disclosed herein relates to the technical field of communication, and in particular to a communication method for establishing a local connection in a roaming location.

BACKGROUND

With the development of smart terminals (e.g., smart phones, tablet computers, smart watches, or the like) and wireless network technology, users expect to use the same terminal at different locations to access the Internet. Different locations may be covered by different communication networks; accordingly, end users may need to pay expensive roaming data service charges for data transmission, especially in the case of international roaming. Specifically, the user identity card (e.g., SIM card) is bound to the home location. Additional roaming charges will be incurred if an end user continues to use the SIM card after leaving the home location of the current SIM card.

In order to cut the costs, the end user may need to purchase a SIM card in the roaming area to pay the local charges. The SIM card is also bound to an operator. If the user wants to change the operator, traditionally, the user has to buy a roaming phone card or go to a branch of the carrier operator for relevant services in the roaming area, where the card will still need to be changed, thus making it inconvenient for the user.

Therefore, in order to overcome the defects of the traditional method, now a virtual user identity card (e.g., a VSIM card) is dynamically allocated to the user so that the user can pay local charges in the roaming area. Specifically, a mobile phone supporting dual cards is taken as an example for providing detailed explanations of the method. The mobile phone is provided with a first communication module and a second communication module. It is assumed that the first communication module is loaded with a SIM card that can be a physical card, or a built-in virtual SIM card containing complete data.

The mobile phone user can, based on the roaming area, download a local VSIM card of the roaming area from the Internet through the SIM card of the first communication module and load the local VSIM card to the second communication module, so that the user can pay local data charges through the VSIM card of the second communication module upon arriving at the roaming area. However, as the acquired VSIM card does not usually contain core authentication information, when the user arrives at the roaming area and wants to register with a local communication network through the VSIM card loaded on the second communication module, the user has to acquire authentication information by a data service roaming function of the SIM card of the first communication module to complete the authentication process, thus to finally complete the network registration and pay local data charges of the roaming area.

In the method of dynamic allocation of the VSIM card, the data service transmission capability of the SIM card of the first communication module has to be applied to download resources from the VSIM card and acquire subsequent authentication information, especially, acquisition of the authentication information will involve data roaming. However, the user downloads the VSIM card to cut down data roaming costs, and as a result, the method goes against the user's intention, thus making it inconvenient for the user.

On the other hand, in order to avoid the user enabling the data service roaming function in the roaming area, the VSIM card provider has to provide the user with a VSIM card containing complete data, thus resulting in waste of resources within the number segment of the VSIM card, and causing financial burden to the VSIM card provider (e.g. the monthly charges of the VSIM).

SUMMARY

In light of the above problems, the subject matter disclosed herein provides a communication method and a mobile communication device, so that the mobile communication device can acquire a virtual user identity card of the roaming area and relevant authentication information anytime and anywhere independently from a data service transmission, so as to use a local communication network of the roaming area for the data service transmission, thus reducing roaming data service costs, and providing flexibility and convenience in acquiring the virtual user identity card and relevant authentication information.

According to one aspect of the subject matter disclosed herein, a method includes detecting a user terminal located at a roaming location; in response to detecting the user terminal located at the roaming location, obtaining user identity information over a first communication network of a home location and a second communication network of the roaming location, the home location being a location in which the user terminal was originally registered for use, and the roaming location being a location that is different from the home location; registering the user identity information with the second communication network of the roaming location; and establishing a localized connection between the user terminal and the second communication network based on the registered user identity information.

According to another aspect of the subject matter disclosed herein, a user terminal includes a first communication module, a second communication module communicatively coupled to the first communication module, and a control module communicatively coupled to one or more of the first communication module and the second communication module. The control module, in some implementations, is configured to, in response to detecting the mobile communication device located at a roaming location, operatively control the first communication module to acquire user identity information via a first communication network of a home location and a second communication network of the roaming location, the home location comprising a location in which the user terminal was originally registered for use, and the roaming location comprising a location that is different from the home location. In a further embodiment, the control module is configured to operatively control the first communication module to send the acquired user identity information to the second communication module associated with the second communication network, and operatively control the second communication module to register the user identity information with the second communication network of the roaming location to establish a localized connection between the user terminal and the second communication network.

In one embodiment, a computer program product includes a computer readable storage medium that stores code executable by a processor. The executable code, in one embodiment, includes code to perform detecting a user terminal located at a roaming location, obtaining user identity information over a first communication network of a home location and a second communication network of the roaming location, the home location being a location in which the user terminal was originally registered for use, and the roaming location being a location that is different from the home location, registering the user identity information with the second communication network of the roaming location, and establishing a localized connection between the user terminal and the second communication network based on the registered user identity information.

With the communication method and the mobile communication device of the embodiments of the subject matter disclosed herein, the virtual user identity card of the roaming area and relevant authentication information can be acquired anytime and anywhere relying on the service transmission of a circuit-switched domain instead of the service transmission of a packet-switched domain, so as to register with a local mobile communication network of the roaming area through the virtual user identity card and relevant authentication information for a data service transmission, so that the user can pay local data charges, allowing roaming data service costs to be reduced, and providing flexibility and convenience in acquiring the virtual user identity card and relevant authentication information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
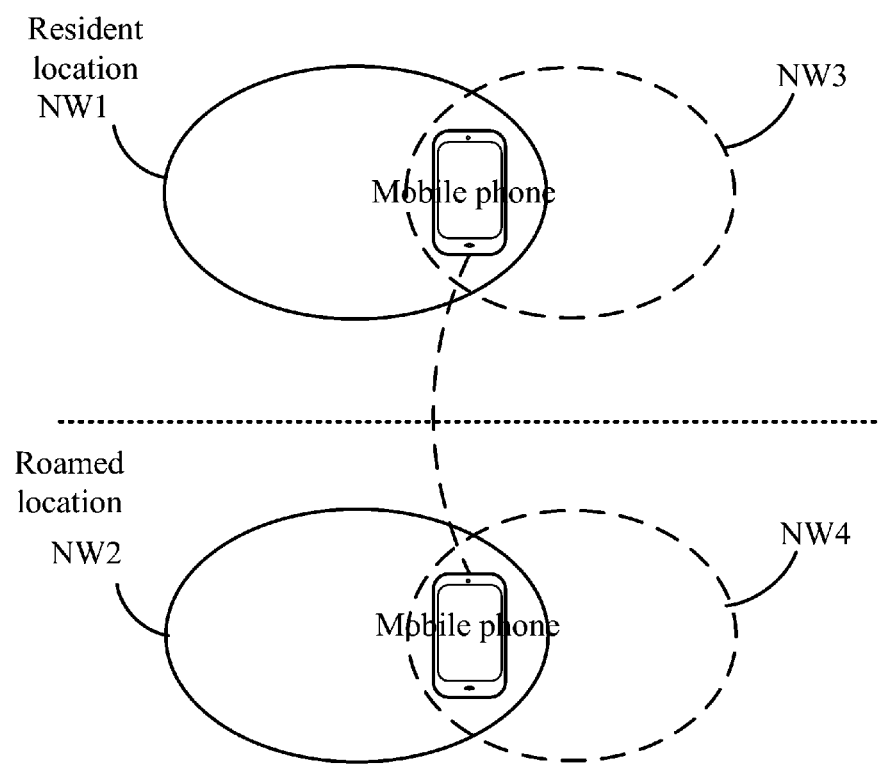
FIG. 1 schematically illustrates an application scenario according to an embodiment of the subject matter disclosed herein.

The embodiments of the subject matter disclosed herein will be described in details in combination with drawings for the embodiments of the subject matter disclosed herein. It is obvious that the embodiments described herein are only some of the embodiments of the subject matter disclosed herein.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The mobile communication device in the embodiments of the subject matter disclosed herein can be various mobile terminals or user terminals (e.g., a mobile phone, a tablet computer a laptop, a wearable device (e.g., a smart watch, an optical head-mounted display, or the like), and/or the like), or a portable, pocketable, handheld, computer built-in or vehicle-mounted mobile device. The mobile communication device can execute wireless network access for voice and/or data exchanging over various communication networks. Typically, the communication network can be a global system for mobile (GSM) network, a code division multiple access (CDMA) network, a wide code division multiple access (WCDMA) network, or a long term evolution (LTE) communication network. Different types of communication networks may be operated by different operators. The types of communication networks do not limit the embodiments of the subject matter disclosed herein.

FIG. 1 schematically illustrates an application scenario of the technical scheme based on an embodiment of the subject matter disclosed herein. In FIG. 1, a mobile phone capable of supporting dual cards is taken as an example for the description of the mobile communication device. That is, the mobile phone is provided with two communication modules, and each communication module can respectively correspond to a (virtual) user identity card. In such a way, the mobile phone can conduct communication through the two communication modules at the same time.

Typically, a mobile phone user is in his place of permanent residence, but he may travel from the place of permanent residence to a roaming area due to job responsibility, traveling, etc. In the place of permanent residence, the user usually has at least one user identity card for communication and browsing the Internet. The user identity card can be a SIM card, a user identity module (UIM) card, or the like. The type of user identity card can be changed with the type of communication network. For illustrative purposes herein, it is assumed that a physical SIM card is inserted in the user's mobile phone, and the SIM card is bound to a communication network NW1 in the place of permanent residence as shown in FIG. 1, that is, the home network of the SIM card is the communication network NW1. During activities in the place of permanent residence, the user can communicate with the communication network NW1 through the SIM card, that is, the user can make telephone calls and browse the Internet by using the service transmission over the communication network NW1.

When the mobile phone user leaves the place of permanent residence and arrives at the roaming area, the SIM card is in a roaming status in the roaming area if the roaming service function of the SIM card is enabled. Taking international roaming as an example, the mobile phone user uses a network (e.g., the communication network NW2 as shown in FIG. 1) of an overseas operator in the information registration roaming area of the SIM card in an international roaming status for communication and browsing the Internet over the network. The resulted charging standard of international roaming is determined based on the agreement between operators of the two countries or regions, and the data service charges of international roaming in most of the countries or regions are higher than the domestic data service charges. Specifically, in the case as shown in FIG. 1 which is taken as an example, if the user registers with the communication network NW2 of the roaming area through the SIM card registered to the communication network NW1 of the place of permanent residence in the roaming area, roaming charges incurred in the roaming area will be determined through the agreement between the operator of the communication network NW1 and the operator of the communication network NW2. Therefore, to reduce service roaming costs, the end user has to acquire a local SIM card (or VSIM card) of the roaming area to register with a local communication network (e.g., the communication network NW2 in FIG. 1) of the roaming area to pay the local charges.

Figure 2:
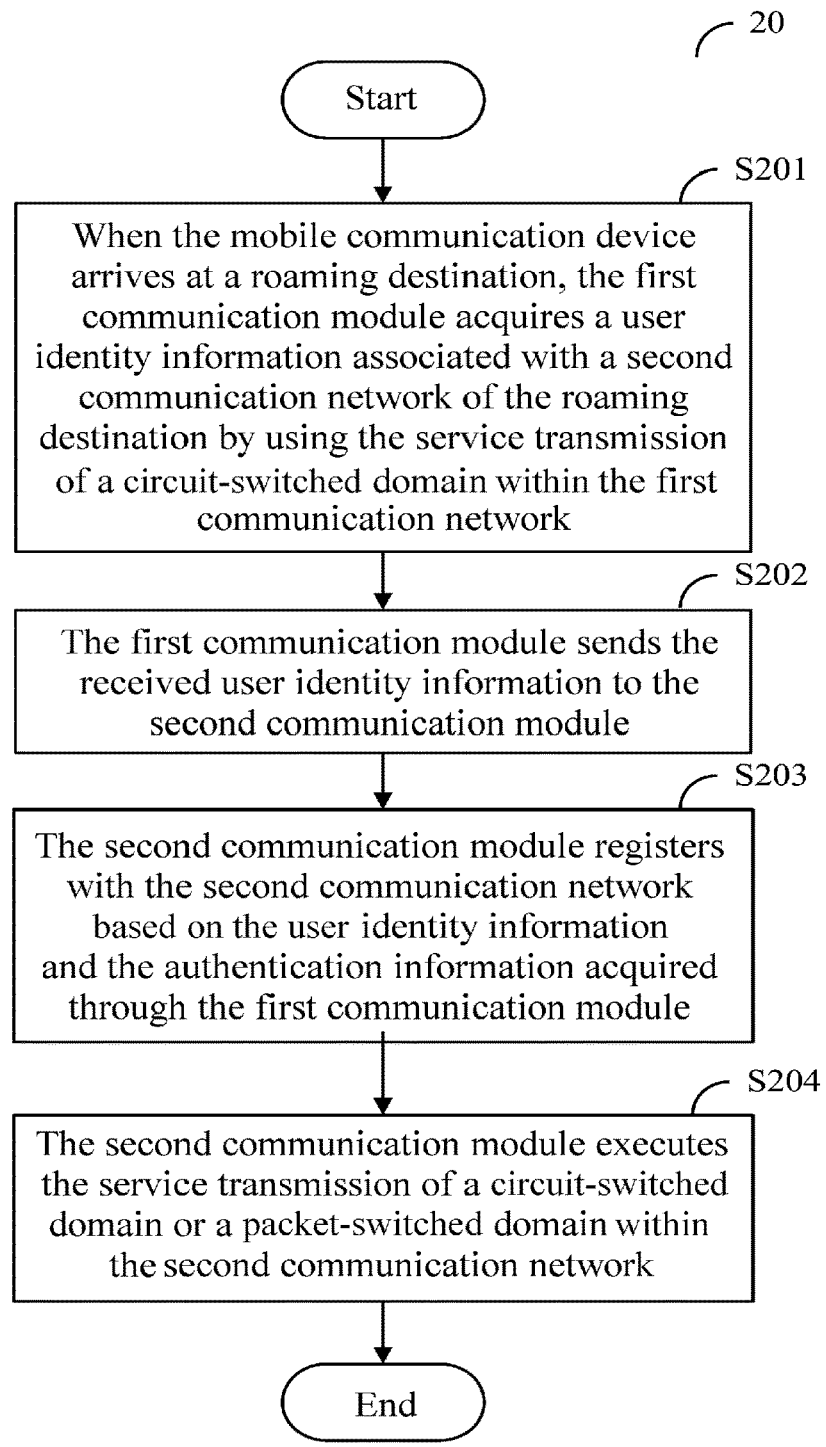
FIG. 2 schematically illustrates a flow diagram of a communication method based on an embodiment of the subject matter disclosed herein.

FIG. 1 and FIG. 2 will be combined to describe how to acquire card information of the local VSIM card of the roaming area and relevant authentication information by the communication method 20 so that the user can pay local service charges. FIG. 2 schematically illustrates a flow diagram of a communication method 20 based on an embodiment of the subject matter disclosed herein. The communication method 20 as shown in FIG. 2 can be applied to the mobile communication device (e.g., the mobile phone as shown in FIG. 1). The mobile communication device can comprise a first communication module and a second communication module, wherein the first communication module can execute a service transmission of a circuit-switched domain (CS) within the first communication network (e.g., the communication network NW1 in FIG. 1).

Specifically, to facilitate better understanding, the mobile phone as shown in FIG. 1 is taken as an example for illustration. As mentioned above, it is assumed that the first communication module of the mobile phone is loaded with a first SIM card registered to the communication network NW1 of the place of permanent residence, that is, the mobile phone can execute the service transmission over the communication network NW1 through the first SIM card on the first communication module.

It shall be noted that the service transmission generally covers the service transmission of a circuit-switched (CS) domain and the service transmission of a packet-switched (PS) domain. Specifically, the service transmission of the CS domain is used for providing, for example, phone call service. The service transmission of the PS domain is used for providing, for example, data service for browsing the Internet. The communication method and network architecture between the CS domain and those of the PS domain are different. The way the CS domain and the PS domain work is known by a person skilled in the art, and will not be repeated herein.

In the communication method 20 based on an embodiment of the subject matter disclosed herein, a first SIM card loaded on the first communication module of the mobile phone would only need to support the service transmission of the CS domain. There is no need to use the service transmission of the PS domain. Therefore, the user can disable the service roaming function of the PS domain of the first SIM card and only retain the service roaming function of the CS domain before going to the roaming area. In such a way, the user can utilize service roaming of the CS domain of the first SIM card after arriving in the roaming area.

As shown in FIG. 2, the communication method 20 starts from step S201. In step S201, when the mobile communication device arrives in a roaming area, the first communication module acquires a user identity information associated with a second communication network (e.g., the communication network NW2 in FIG. 1) of the roaming area by using the service transmission of a circuit-switched domain within the first communication network. That is, when the mobile phone user arrives in the roaming area, the user can acquire the card information of a VSIM card registered to the communication network NW2 as shown in FIG. 2 of the roaming area by using the service transmission of the CS domain of the first SIM card in step S201.

Specifically, as mentioned above, while the mobile phone user retains the service roaming function of the CS domain of the first SIM card, he or she can still utilize the service transmission of the CS domain of the first SIM card after arriving in the roaming area. In fact, using the service transmission of the CS domain of the first SIM card involves not only home network NW1 of the first SIM card, but also a communication network having a roaming protocol with the communication network NW1 of the roaming area. More specifically, if the communication network having a roaming protocol with the communication network NW1 of the roaming area is the communication network NW2 in FIG. 1, the mobile phone user has to register with the communication network NW2 through the first SIM card, and then establish a CS domain service transmission channel of the first communication module of the mobile phone—communication network NW2—communication network NW1.

Although the subject matter disclosed herein is described by taking the example that the communication network NW2 is the communication network having a roaming protocol with the communication network NW1, the subject matter disclosed herein is not limited thereto. Communication networks of other operators may exist in the roaming area, such as the communication network NW4 as shown by dotted line in FIG. 2. The mobile phone user can register with the communication network NW4 through the first SIM card, and then establish the CS domain service transmission channel of the first communication module of the mobile phone—communication network NW4—communication network NW1. The operator's communication network in the roaming area used by the user for roaming is determined by the agreement between the operator of the home network of the first SIM card and the operator in the roaming area. The principles of roaming are well known by a person skilled in the art, and will not be repeated herein, so as not to confuse the inventive points of the subject matter disclosed herein.

Card information of the VSIM card can, for example, comprise a mobile phone number and an international mobile subscriber identity (IMSI) which is a label for distinguishing a mobile subscriber, and can, for example, comprise a country code of the mobile subscriber, mobile network code and mobile subscriber identity code. The card information is generally stored in a user identity card. However, the acquired card information of the VSIM card may not comprise core authentication information (e.g., an authentication key). That is, when the user registers with the communication network NW2 of the roaming area by using card information of the VSIM card, the communication network NW2 will authenticate the VSIM card to identify its legitimacy. Thus the user has to separately acquire authentication information for network registration. The process of acquiring the authentication information will be described in detail below.

As mentioned above, the card information of the VSIM card over the communication network NW2 can be provided by a company specialized in user identity cards of the roaming area. The specific company can be a product supplier of the mobile communication device, or a service provider authorized by the operator of the communication network NW2. The specific company can, for example, acquire multiple physical SIM cards over the communication network NW2 in advance, and read card information from the physical SIM cards to form multiple VSIM cards and manage card information of the VSIM cards. Then a VSIM card can be allocated to a mobile phone user in the roaming area. However, in order to reduce costs and improve the efficiency of the VSIM cards, the card information of the VSIM cards usually does not contain core authentication information (e.g., an authentication key). Only when the user actually uses the card information of a VSIM card for network registration, the specific company will send the authentication information to the user, for example, the specific company can then further acquire an authentication key of the VSIM card from the operator, perform relevant calculations to obtain an authentication result and provide the authentication result to the user, so that the user can successfully complete network registration.

It should be understood that allocation of the VSIM card to the user and acquisition of the VSIM card are actually equivalent to sending the card information of the VSIM card to the user and acquiring the card information of the VSIM card. This is because the user can simulate a VSIM card by using the acquired card information of the VSIM card and load the card information on the mobile phone, and the resulted effect is equal to inserting a physical SIM card in the mobile phone; therefore, acquisition of the card information of the VSIM card is equivalent to acquiring a VSIM card.

As shown in FIG. 2, the communication method 20 may perform step S202 after performing step S201. In step S202, the first communication module sends the received user identity information to the second communication module. That is, the first communication module of the mobile phone sends the card information of the VSIM card acquired by step S201 to the second communication module. Thus the second communication module can load the VSIM card.

Specifically, there are two cases regarding the second communication module of the mobile phone. In the first case, the second communication module itself is not loaded with any SIM (VSIM) card. In the second case, the second communication module can be loaded with another SIM card different from the first SIM card. For example, it is assumed that the second communication module of the mobile phone is loaded with a second SIM card registered to the communication network NW3 as shown by dotted line in FIG. 1. The communication network NW1 herein is normally different from the second communication network NW2, and operated by different operators. Of course, the two SIM cards can also be two telephone numbers in the same communication network.

In the first case, the second communication module can certainly load the VSIM card received from the first communication module. In the second case, the second SIM card on the second communication module has to be disabled firstly (uninstalled), and then the VSIM card can be loaded. For example, the user can disable the second SIM card before going to the roaming area or after acquiring the VSIM card, depending on the actual conditions.

As shown in FIG. 2, the communication method 20 may perform step S203 following step S202. In step S203, the second communication module registers with the second communication network based on the user identity information and the authentication information acquired through the first communication module.

Specifically, as mentioned above, the card information of the VSIM card acquired in the previous step does not contain relevant authentication information; therefore, the authentication information has to be acquired if the VSIM card is to be used to register with, for example, the communication network NW2. For example, the first communication module can be still used to acquire the authentication information by the CS domain service roaming function as mentioned above, which will be described in details below. In such a way, the second communication module can register with the communication network NW2 based on the card information of the VSIM card and an authentication information.

As shown in FIG. 2, the communication method 20 may perform step S203 following step S202. In step S204, the second communication module executes the service transmission of a circuit-switched domain or a packet-switched domain within the second communication network. Specifically, after completing network registration in step S203, the service transmission of the CS domain and/or PS domain over the communication network NW2 can be executed by step S204, that is, the VSIM card registered to the communication network NW2 of the roaming area can be used so that the user can pay local service charges in the roaming area. After step S204 is performed, the communication method 20 is completed.

To facilitate better understanding of the communication method 20 based on an embodiment of the subject matter disclosed herein as shown in FIG. 2, a more intuitive example is shown below. In one example, it is assumed that the first communication module of the user's mobile phone is loaded with a SIM card registered to the CMCC network of China Mobile, and the user wants to go to America, and starts roaming services associated with the CS domain of the SIM card before going abroad. In such a way, the user can register with a local American communication network through the SIM card after arriving in America, such as the AT&T network. When the user wants to use the data service (i.e., browse the Internet), the first communication module can acquire the card information of a local VSIM card of a local target registration network through the CS domain service transmission channel of the first communication module—AT&T network—CMCC network of the mobile phone, and send the card information of the VSIM card to the second communication module, so that the second communication module can load the VSIM card. The target registration network can be the AT&T network or other communication network, such as the communication network of the operator Version. If the target registration network is the communication network of the operator Version, the user can register with the communication network of the operator Version through the second communication module based on the acquired card information of the VSIM card and relevant authentication information further acquired through the first communication module, and conduct data service transmission over the communication network of the operator Version by using the VSIM card through the second communication module. Thus, the user can pay local data service charges.

It should be noted herein that the target registration network of the roaming area and the local network used by roaming can be the same or different, and the subject matter disclosed herein is not limited thereto.

In the communication method 20 based on an embodiment of the subject matter disclosed herein as shown in FIG. 2, a virtual user identity card of the roaming area and relevant authentication information can be acquired anytime and anywhere replying on the service transmission of circuit-switched domain instead of the service transmission of packet-switched domain, so as to register with a local mobile communication network of the roaming area through the virtual user identity card and relevant authentication information for data service transmission, so that the user can pay local data charges, allowing roaming data service costs to be reduced, and providing flexibility and convenience in acquiring the virtual user identity card and relevant authentication information.

Optionally, although not shown in FIG. 2, step S201 can be detailed as follows: the first communication module acquires user identity information associated with the second communication network from a server by using the service transmission of a circuit-switched domain within the first communication network.

Specifically, the specific company specialized in VSIM cards of the roaming area can, for example, sets up a server to manage multiple VSIM cards associated with the second communication network (e.g., the communication network NW2 in FIG. 1). In such a way, the user's mobile phone can acquire the card information of the VSIM card by step S201 in the communication method 20 as shown in FIG. 2.

Furthermore, the server can be divided into, for example, roaming application server and VSIM resource management server, wherein the roaming application server is used to handle roaming applications in the roaming area, and the VSIM resource management server is used to manage VSIM card resources of the roaming area. However, it should be understood that the servers may not be categorized in multiple servers, and instead, one server can have multiple functions. A person skilled in the art can implement detailed settings on the server based on actual requirements, thus the subject matter disclosed herein is not limited thereto.

In addition, it should be understood that the server is only an example, and the subject matter disclosed herein is not limited thereto. In addition to acquiring the card information of the VSIM card from the server, the card information can be acquired from a core network or other places.

Further optionally, although not shown in FIG. 2, the optional step can comprise the following: the first communication module acquires the user identity information from the server through a first communication channel between the mobile communication terminal and the first communication network, and a second communication channel between the first communication network and the server, and acquires the user identity information from the server, wherein the first communication channel is a circuit-switched domain communication channel.

Specifically, still the case as shown in FIG. 1 is taken as an example, the communication between the first communication module of the user's mobile phone and the server will be realized through the first communication channel between the mobile phone and the communication network NW1 and the second communication channel between the communication network NW1 and the server. That is, the communication between the first communication module of the user's mobile phone and the server will be relayed through the communication network NW1.

The CS domain communication mechanism of unstructured supplementary service data (USSD) and satellite tool kit (STK) can be adopted between the first communication module of the mobile phone and the communication network NW1 to realize communication. The USSD will be taken as an example below for illustration.

It is assumed that a roaming protocol exists between the communication network NW4 of the roaming area and the home network NW1 of the first SIM card on the first communication module of the user's mobile phone. When the mobile phone user arrives in the roaming area, the first communication module of the mobile phone can access the communication network NW4 of the roaming area through a standalone dedicated control channel (SDCCH), a fast associated control channel (FACCH) or other communication channels, so as to send USSD-related data to the communication network NW4 as the first SIM card reserves the USSD service roaming functions. The communication network NW4 of the roaming area forwards the USSD-related data to the first communication network NW1 of the place of permanent residence based on the roaming protocol. The operator of the communication network NW1 of the place of permanent residence can set a USSD platform to receive and process the USSD-related data received from the user's mobile phone, so as to further forward the USSD-related data to the server. Similarly, the USSD platform can process data received from the server to send the USSD-related data to the communication network NW4 of the roaming area, so that the communication network NW4 can forward the USSD-related data to the user's mobile phone. Thus, a USSD communication channel of the first communication module—communication network NW4—communication network (USSD platform) of the mobile phone is established between the first communication module of the user's mobile phone and the communication network NW1.

Although the USSD is taken as an example for illustration, the subject matter disclosed herein is not limited thereto, and a person skilled in the art can use other proper CS domain communication mechanisms, in addition to the USSD based on actual requirements. In addition, the SDCCH and FACCH are only examples of access network channels, and the subject matter disclosed herein is not limited thereto. A person skilled in the art can use other proper access network channels based on actual requirements.

Further optionally, the second communication channel is a data packet domain communication channel. That is, the PS domain communication mechanism can be established between the communication network NW1 as shown in FIG. 1 and the server.

For example, the USSD platform can process the USSD-related data received from the user's mobile phone, and then forward the USSD-related data to the server by using a specific SMPP (short message peer to peer) protocol and an IP (Internet protocol) protocol. In addition, when the server consists of, for example, a roaming application server and a VSIM resource management server, the USSD platform can forward the processed USSD-related data from the user to the roaming application server by using the specific SMPP protocol and the IP protocol, then the roaming application server can further forward the USSD-related data to the VSIM resource management server by using the IP protocol.

It should be understood that the specific SMPP protocol and the IP protocol are only examples for illustration, and a person skilled in the art can use any proper communication protocol based on actual requirement. Similarly, the second communication channel between the communication network NW1 and the server can further adopt the PS domain communication mechanism.

Optionally, although not shown in FIG. 2, the optional step in which the first communication module acquires the user identity information associated with the second communication network from the server by using the service transmission of circuit-switched domain within the first communication network can further comprise the following: the first communication module sends a user identity request associated with the second communication network to the server by using the service transmission of a circuit-switched domain within the first communication network; and the first communication module receives the user identity information from the server by using the service transmission of a circuit-switched domain within the first communication network.

Specifically, when the mobile phone user wants to acquire a local VSIM card of the roaming area in the roaming area, the user has to send relevant request to the server through the first communication module by CS domain service roaming, and then receive the card information of the VSIM card from the server through the first communication module by CS domain service roaming. That is, two-way communication can be realized between the first communication module of the user's mobile phone and the server by using CS domain service roaming.

Further optionally, the server selects the user identity information matching with the user identity request from the managed pieces or portions of user identity information associated with the second communication network based on the user identity request.

Specifically, the request, for example, can contain mobile phone mode, relevant parameters (e.g. information of the operator) of the communication network (e.g., the communication network NW2 and/or NW4 in FIG. 1) of the roaming area and other information. In such a way, the server can select a VSIM card matching with the request from the managed multiple VSIM cards registered to the communication network of the roaming area based on the information contained in the request. That is, the VSIM card registered to the roaming area and the user's mobile phone is selected and allocated to the user.

Optionally, although not shown in FIG. 2, step S203 in the communication method 20 can comprise the following sub-steps: the second communication module sends a registration request to the second communication network based on the user identity information; the second communication module receives an authentication request from the second communication network, and sends the authentication request to the first communication module; the first communication module sends the authentication request to the server and acquires authentication information from the server by using the service transmission of circuit-switched domain within the first communication network; and the second communication module receives the authentication information from the first communication module, and sends the authentication information to the second communication network.

Specifically, the optional sub-steps embody the specific process in which the second communication module registers with, for example, the communication network NW2 in FIG. 1 based on the card information of the VSIM card acquired in the previous steps. Firstly, the second communication module sends a registration request to the communication network NW2 based on the card information of the VSIM card. As the card information of the VSIM card does not contain relevant authentication information, for the sake of safety, the communication network NW2 has to authenticate the mobile phone user to use the VSIM card, and therefore will require the user to further conduct authentication, i.e., send an authentication request to the second communication module. The purpose of authentication is to protect the communication network NW2 and to prevent it from being illegally accessed, and to reject any illegitimate user pretending to be a legitimate user trying to "intrude" the communication network NW2.

Generally, the authentication request, for example, can contain a pseudo-random number. The communication network NW2 for example can set up a validation device, and store a random number, an authentication key of an SIM (VSIM) card registered to the communication network NW2, and an authentication information acquired based on the pseudo-random number and the authentication key in the validation device. The authentication key of the SIM card registered to the communication network NW2 can, for example, be well protected by a physical entity of the SIM card from being illegally acquired by a third party. In such a way, only a legitimate user of the SIM card knows the authentication key, and can figure out the authentication information after receiving the pseudo-random number. When a validation device of the communication network NW2 determines that the stored authentication information is consistent with the authentication information received from the user's mobile phone, it can be determined that the user is a legitimate user of the SIM card.

As mentioned above, as the information of the VSIM card acquired from the server does not contain an authentication key, the mobile phone user has to acquire authentication information from the server. Therefore, the second communication module further sends the authentication request to the first communication module, so that the first communication module can further send the authentication request to the server by using the CS domain service roaming function of the first SIM card.

If the authentication request comprises a pseudo-random number, the server can, for example, further acquire an authentication key of the VSIM card from the operator, and conduct a pre-defined algorithm on the pseudo-random number and the authentication key to obtain a response number, and the response number is the authentication information (authentication value). Hence, the server sends the authentication information back to the first communication module. The first communication module then sends the authentication information to the second communication module. In such a way, the second communication module can send the authentication information to the communication network NW2. After receiving the authentication information from the second communication module, the validation device in the communication network NW2 compares the received authentication information with the stored authentication information. If the received authentication information is the same as the stored authentication information, the validation device will confirm the validity of the VSIM card. Hence, the user successfully registers with the communication network NW2 by using the VSIM card, so that the user can pay the local service charges.

Figure 3:
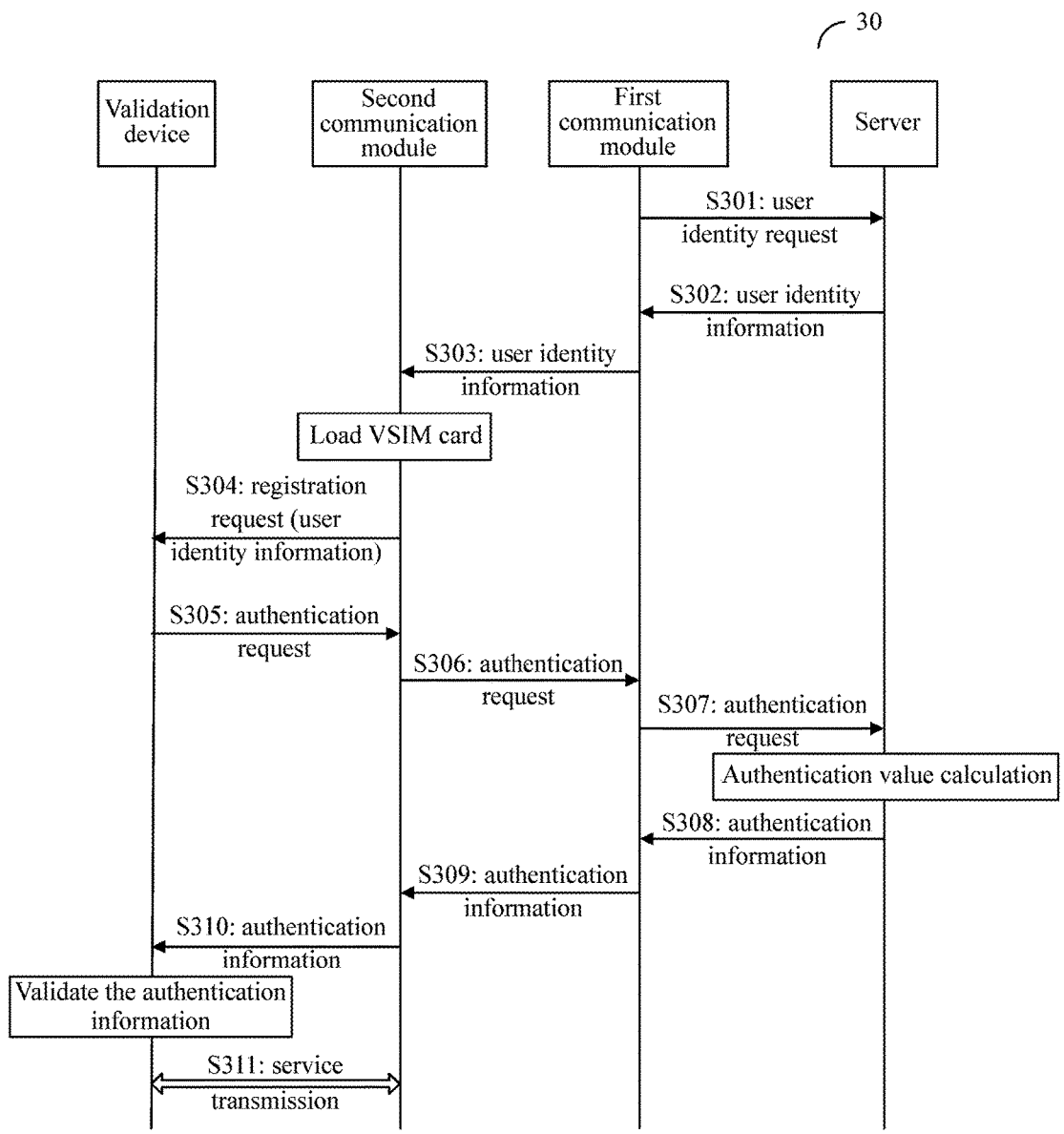
FIG. 3 schematically illustrates a flow diagram of the process of acquiring the user identity information and the authentication information based on an embodiment of the subject matter disclosed herein.

To facilitate better understanding of the subject matter disclosed herein, an exemplary process 30 is described in detail by referring to FIG. 3 below, wherein the communication method based on an embodiment of the subject matter disclosed herein enables a user to pay the local service charges in the roaming area. FIG. 3 schematically illustrates a flow diagram of the process of acquiring the user identity information and the authentication information based on an embodiment of the subject matter disclosed herein. The process 30 is realized by information flow among the validation device as shown in FIG. 3, the second communication module, the first communication module and the server. The validation device here is, for example, the validation device in the communication network NW2.

As shown in FIG. 3, the first communication module sends the user identity request to the server (S301). Then the server selects a proper user identity information from the managed pieces of user identity information based on the user identity request, and sends the user identity information to the first communication module (S302). The first communication module then sends the user identity information to the second communication module (S303). And then the second communication module can load a corresponding VSIM card based on the user identity information. In addition, when the user wants to register with the communication network NW2, the second communication module further sends a registration request to the validation device based on the user identity information, and the request, for example, comprises the user identity information (S304). To identify the authenticity of the user, the validation device sends an authentication request (S305) to the second communication module. The second communication module sends the authentication request to the first communication module (S306). And the first communication module further sends the authentication request to the server (S307). The server then executes an authentication value calculation based on the authentication request, obtains the authentication information, and sends the authentication information to the first communication module (S308). The first communication module sends the authentication information to the second communication module (S309). And the second communication module further sends the authentication information to the validation device (S310). The validation device therefore validates the authentication information. If the validation is acceptable, a service transmission (S311) of CS domain and/or PS domain can be established between the second communication module and the communication network NW2.

It should be noted that, S301 and S302 in FIG. 3 can correspond to step S201 in the communication method 20 as shown in FIG. 2. S303 in FIG. 3 can correspond to step S202 in the communication method 20 as shown in FIG. 2. S304 in FIG. 3 can correspond to step S203 in the communication method 20 as shown in FIG. 2. S311 in FIG. 3 can correspond to step S204 in the communication method 20 as shown in FIG. 2.

Compared with existing methods, the subject matter disclosed herein acquires authentication information by using the service transmission of the CS domain instead of the service transmission of the PS domain; therefore, data roaming is not required. Thus the subject matter disclosed herein can reduce data roaming costs for the user in the roaming area, and reduce the cost of the VSIM card provider, improving the use efficiency of the VSIM card.

It should be understood that the VSIM card has to be authenticated in network registration and when a routing area or tracking area is updated, and the authentication process is the same as S304 through S310 in FIG. 3.

Further optionally, although not shown in FIG. 2, the sub-step in which the first communication module sends the authentication request to the server and acquires authentication information from the server by using the service transmission of a circuit-switched domain within the first communication network can comprise the following steps: the first communication module sends the authentication request to the server and acquires the authentication information from the server through the first communication channel between the mobile communication terminal and the first communication network, and the second communication channel between the first communication network and the server, wherein the first communication channel is a circuit-switched domain communication channel.

Specifically, as in the case of acquisition of the user identity information associated with the second communication network from the server, that is, taking the example in FIG. 1 as an example, the communication between the first communication module of the user's mobile phone and the server will be realized through the first communication channel between the mobile phone and the communication network NW1 and the second communication channel between the communication network NW1 and the server. That is, the communication between the first communication module of the user's mobile phone and the server will be relayed through the communication network NW1.

Similarly, the CS domain communication mechanism of, for example, unstructured supplementary service data (USSD) and satellite tool kit (STK) can be adopted between the first communication module of the mobile phone and the communication network NW1 to realize communication, which will not be repeated herein.

Further optionally, the second communication channel is a data packet domain communication channel. That is, as in the case of acquisition of the user identity information associated with the second communication network from the server, the PS domain communication mechanism can be adopted between the communication network NW1 as shown in FIG. 1 and the server. Similarly, the second communication channel between the communication network NW1 and the server can also adopt the PS domain communication mechanism. The case of acquisition of the user identity information associated with the second communication network from the server has been described in details above, and will not be repeated herein.

It should be understood that the user's mobile phone in the roaming area can communicate with the server anytime and anywhere relying on the service transmission of the CS domain instead of the service transmission of the PS domain by the communication method 20 based on an embodiment of the subject matter disclosed herein; therefore, when the mobile phone user does not need to use the acquired VSIM card to browse the Internet for a period of time in the roaming area, the mobile phone user can still interact with the server by using the service transmission of the CS domain through the first communication module, so that the server can recover resources of the VSIM card for that period of time, and allocate the resources to other users. If the user has to use the resources of the VSIM card after that period of time, the user can still reacquire the resources of the VSIM card from the server by using the service transmission of the CS domain through the first communication module. That is, even if the user's VSIM card is revoked in the roaming area, the VSIM card can still be flexibly and conveniently reacquired. Thus, the VSIM card can be further recovered flexibly, which can improve the use efficiency of the resources of the VSIM card.

It should be noted that the user can certainly interact with the server regarding the revoked information from the VSIM card by using the service transmission of the PS domain of the VSIM card instead of the service transmission of the CS domain of the first communication module through the second communication module when the VSIM card is still available. That is, the user can acquire the card information of the VSIM card and/or relevant authentication information by using the service transmission of the CS domain on the first SIM card of the first communication module only when the VSIM card is not available.

All (optional) steps of the communication method 20 based on an embodiment of the subject matter disclosed herein are described in details in combination with FIG. 1 to FIG. 3. By the communication method 20, a virtual user identity card of the roaming area and relevant authentication information can be acquired anytime and anywhere relying on the service transmission of a circuit-switched domain instead of the service transmission of a packet-switched domain, so as to register with a local communication network of the roaming area through the virtual user identity card and relevant authentication information for data service transmission, so that the user can pay local data charges, allowing roaming data service costs to be reduced, providing flexibility and convenience in acquiring the virtual user identity card, and further realizing flexible revoking of the virtual user identity card and relevant authentication information to improve the use efficiency.

Figure 4:
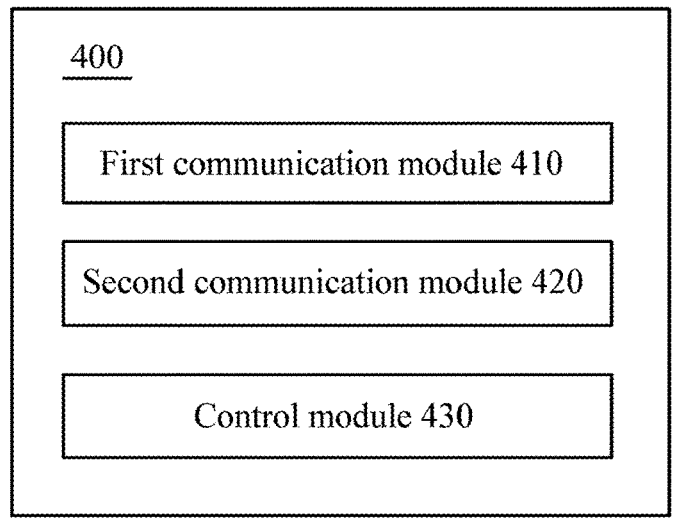
FIG. 4 schematically illustrates a block diagram of a mobile communication device based on an embodiment of the subject matter disclosed herein.

An example of the configuration of the mobile communication device 400 based on an embodiment of the subject matter disclosed herein will be described by referring to FIG. 4 below. FIG. 4 schematically illustrates a configuration block diagram of a mobile communication device 400 based on an embodiment of the subject matter disclosed herein. The mobile communication device 400 can be various mobile terminals (e.g., a mobile phone, a tablet computer or a laptop), or a portable, pocketable, handheld, computer built-in or vehicle-mounted mobile device.

As shown in FIG. 4, the mobile communication device 400 based on an embodiment of the subject matter disclosed herein can comprise a first communication module 410, a second communication module 420, and a control module 430.

The first communication module 410 can execute the service transmission of a circuit-switched domain within the first communication network. The second communication module 420 is connected to the first communication module 410. The control module 430 controls the first communication module 410 to acquire a user identity information associated with the second communication network of the roaming area by using the service transmission of circuit-switched domain within the first communication network when the mobile communication device 400 arrives at a roaming area; send the received user identity information to the second communication module 420; control the second communication module 420 to register with the second communication network based on the user identity information and the authentication information acquired through the first communication module 410; and execute the service transmission of a circuit-switched domain or a packet-switched domain within the second communication network.

Optionally, the control module 430 further controls the first communication module 410 to acquire the user identity information associated with the second communication network from a server by using the service transmission of circuit-switched domain within the first communication network.

Optionally, the control module 430 further controls the first communication module 410 to acquire the user identity information from the server through a first communication channel between the mobile communication terminal 400 and the first communication network, and a second communication channel between the first communication network and the server, wherein the first communication channel is a circuit-switched domain communication channel. Further optionally, the second communication channel is a data packet domain communication channel.

Optionally, the control module 430 further controls the first communication module 410 to send a user identity request associated with the second communication network to the server by using the service transmission of a circuit-switched domain within the first communication network, and receive the user identity information from the server by using the service transmission of the circuit-switched domain within the first communication network.

Optionally, the control module 430 further controls the second communication module 420 to send a registration request to the second communication network based on the user identity an information, receive an authentication request from the second communication network, and send the authentication request to the first communication module 410. In addition, the control module 430 further controls the first communication module 410 to send the authentication request to the server and acquire the authentication information from the server by using the service transmission of a circuit-switched domain within the first communication network. And the control module 430 further controls the second communication module 420 to receive the authentication information from the first communication module 410, and send the authentication information to the second communication network.

Optionally, the control module 430 further controls the first communication module 410 to send the authentication request to the server and acquire the authentication information from the server through the first communication channel between the mobile communication terminal and the first communication network, and the second communication channel between the first communication network and the server, wherein the first communication channel is a circuit-switched domain communication channel. Further optionally, the second communication channel is a data packet domain communication channel.

As mentioned above, it should be understood that the first communication module 410 and the second communication module 420 can be realized in the hardware form of a modem or in the software form of a software protocol stack. In addition, although the first communication module 410 and the second communication module 420 are separately set in FIG. 4, the two modules can be located on the same modem or different modems physically.

In addition, the mobile communication device 400 in FIG. 4 can perform all (optional) steps in the communication method 20 based on an embodiment of the subject matter disclosed herein as described in detail in FIG. 1 through FIG. 3, and all steps of the example process 30 in FIG. 30, which will not be repeated here.

Through the mobile communication device 400, a virtual user identity card of the roaming area and relevant authentication information can be acquired anytime and anywhere relying on the service transmission of a circuit-switched domain instead of the service transmission of a packet-switched domain, so as to register with a local communication network of the roaming area through the virtual user identity card and relevant authentication information for data service transmission, so that the user can pay local data charges, allowing roaming data service costs to be reduced, providing flexibility and convenience in acquiring the virtual user identity card and relevant authentication information, and further realizing flexible revoking of the virtual user identity card to improve the use efficiency.

Figure 5:
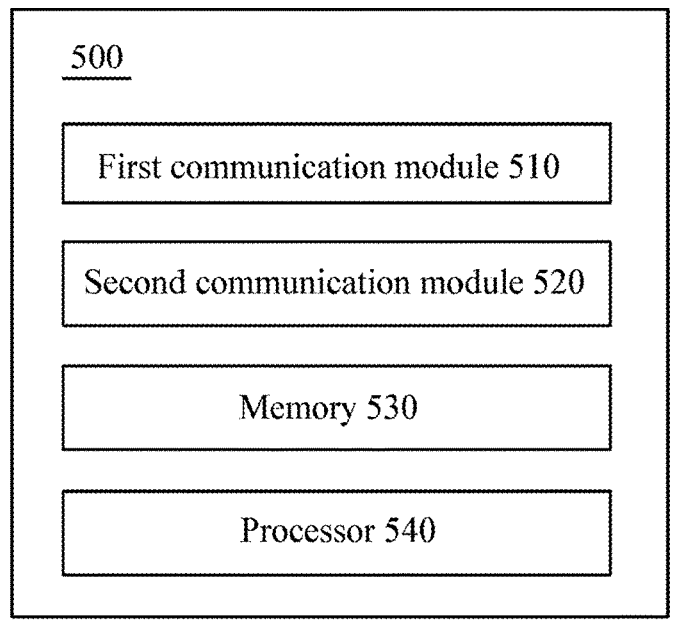
FIG. 5 schematically illustrates a block diagram of another mobile communication device based on an embodiment of the subject matter disclosed herein.

FIG. 5 schematically illustrates a configuration block diagram of another mobile communication device 500 based on an embodiment of the subject matter disclosed herein. As shown in FIG. 5, another mobile communication device 500 comprises: a first communication module 510, a second communication module 520, a memory 530 for storing program codes, and a processor 540 for executing the program code to realize all (optional) steps of the communication method 20 based on an embodiment of the subject matter disclosed herein as described in FIG. 1 through FIG. 3.

The first communication module 510 and the second communication 520 in FIG. 5 are respectively the same as the first communication module 410 and the second communication module 420 in FIG. 4. The memory 530 can comprise at least one of the read-only memory and the random access memory, and the processor 540 provides commands and data. A part of the memory 530 can further comprise a non-volatile random-access memory (NVRAM).

The processor 540 can be a general processor, a digital signal processor (DSP), an application-specific integrated circuit (ASIC), a field programmable gate array (FPGA) or other programmable logic devices, a discrete gate or transistor logic device, or a discrete hardware component. The general processor can be a microprocessor or any conventional processor.

The step of combining with the method disclosed in an embodiment of the subject matter disclosed herein can be directly completed by the processor, or completed by a hardware module and a software module of the processor. The software module can be located in a random access memory, a flash memory, a read-only memory, a programmable read-only memory or an electrically erasable programmable memory, a register or other well established storage medium in the art. The storage medium is located in the memory 530. The processor 540 reads information of the memory 530, and completes the steps of the method in combination with the hardware.

It should be understood by those skilled in the art that all exemplary units and algorithm steps described in combination with the embodiments disclosed in the subject matter disclosed herein can be realized by electronic hardware or combination of computer software and electronic hardware. The execution mode (by hardware or software) of the functions depends on specific applications and design constraints of the technical scheme. A person skilled in the art can realize the function described above by different methods for specific applications; however, the realization shall not be considered to exceed the scope of the subject matter disclosed herein.

A person skilled in the art should clearly understand that, for convenience and conciseness of the description, the actual implementation of the information processing method described above can be realized in reference to corresponding descriptions in the embodiments of the product.

In the embodiments provided by the subject matter disclosed herein, it should be understood that the disclosed device and method can be realized by other means. For example, the embodiments of the device described above are only illustrative. For example, the division of the unit is only a division of logic functions, and in actual application, other division methods are possible. For example, multiple units or components can be combined or integrated to another device, or some features can be omitted, or not implemented.

The unit described as a separate part may or may not be physically separated, and parts shown as units may or may not be physical. Some or all units can be selected based on actual requirements to achieve the purposes of the schemes of the embodiments.

The above mentioned embodiments are only preferred embodiments of the subject matter disclosed herein and not used to limit the claimed scope of the subject matter disclosed herein. All alterations or equivalent replacement which can easily occur to a person skilled in the prior art within the technical scope disclosed by the subject matter disclosed herein shall be encompassed by the scope of the subject matter disclosed herein. Therefore, the scope of the subject matter disclosed herein shall be specified by the scope of the claims.

What is claimed is:

1. A method, comprising:
  detecting a user terminal located at a roaming location, the roaming location comprising a location that is different from a home location where the user terminal is originally registered for use, the home location comprising a first communication network and the roaming location comprising a second communication network different from the first communication network;
  in response to detecting the user terminal located at the roaming location, obtaining, at the user terminal, user identity information by connecting the user terminal to a third communication network at the roaming location, the third communication network different from the first and second communication networks and communicatively coupled to the first communication network, the third communication network configured to transmit unstructured supplementary service data ("USSD") information between the user terminal and the first communication network, the USSD information comprising the user identity information;
registering the user identity information with the second communication network of the roaming location; and
establishing a localized connection between the user terminal and the second communication network based on the registered user identity information.

2. The method of claim 1, further comprising acquiring the user identity information associated with the second communication network at the roaming location from a user by using a service transmission in a circuit switched domain within the first communication network.

3. The method of claim 2, further comprising acquiring the user identity information from the server via a first communication channel between the user terminal and the first communication network and a second communication channel between the first communication network and the server.

4. The method of claim 3, wherein the first communication channel is a circuit switched domain communication channel, and the second communication channel is a data packet domain communication channel.

5. The method of claim 2, further comprising:
sending a user identity request associated with the second communication network to the server by using the service transmission in the circuit switched domain within the first communication network; and
receiving the user identity information from the server by using the service transmission in the circuit switched domain within the first communication network.

6. The method of claim 5, further comprising selecting, based on the user identity request, the user identity information matching the user identity request from portions of managed user identity information associated with the second communication network.

7. The method of claim 2, further comprising:
sending a registration request to the second communication network based on the user identity information;
receiving an authentication request from the second communication network;
sending the authentication request to the server;
receiving authentication information from the server by using the service transmission of the circuit switched domain within the first communication network; and
sending the authentication information to the second communication network.

8. The method of claim 7, wherein the authentication request is sent to the server and the authentication information is received from the server through a first communication channel between the user terminal and the first communication network, and a second communication channel between the first communication network and the server.

9. The method of claim 8, wherein the first communication channel is a circuit switched domain communication channel, and the second communication channel is a data packet domain communication channel.

10. The method of claim 1, further comprising disabling service transmissions in a circuit switched domain within the first communication network prior to the registering to the second communication network based on the obtained user identity information.

11. The method of claim 2, further comprising:
disabling the service transmission in one or more of the circuit switched domain and a packet switched domain within the second communication network;
sending a user identity retrieval request to the server using the service transmission in the circuit switched domain within the first communication network; and
deleting the user identity information.

12. The method of claim 11, further comprising activating the service transmission in the circuit switched domain within the first communication network prior to sending the user identity retrieval request to the server using the service transmission in the circuit switched domain within the first communication network.

13. A user terminal, comprising:
a first communication module;
a second communication module communicatively coupled to the first communication module; and
a control module communicatively coupled to one or more of the first communication module and the second communication module, the control module configured to:
operatively control the first communication module to detect the user terminal located at a roaming location, the roaming location comprising a location that is different from a home location where the user terminal is originally registered for use, the home location comprising a first communication network and the roaming location comprising a second communication network different from the first communication network;
in response to detecting the user terminal located at the roaming location, operatively control the first communication module to obtain, at the user terminal, user identity information by connecting the user terminal to a third communication network at the roaming location, the third communication network different from the first and second communication networks and communicatively coupled to the first communication network, the third communication network configured to transmit unstructured supplementary service data ("USSD") information between the user terminal and the first communication network, the USSD information comprising the user identity information;
operatively control the first communication module to send the obtained user identity information to the second communication module associated with the second communication network;
operatively control the second communication module to register the user identity information with the second communication network of the roaming location to establish a localized connection between the user terminal and the second communication network.

14. The user terminal of claim 13, wherein the control module further controls the first communication module to acquire the user identity information associated with the second communication network from a server associated with the first communication network by using a service transmission of a circuit-switched domain within the first communication network.

15. The user terminal of claim 14, wherein the control module further controls the first communication module to acquire the user identity information from the server through a first communication channel between the mobile communication terminal and the first communication network, and a second communication channel between the first communication network and the server.

16. The user terminal of claim 15, wherein the first communication channel comprises a circuit-switched domain communication channel, and the second communication channel is a data packet domain communication channel.

17. The user terminal of claim 14, wherein the control module is further configured to control the first communication module to send a user identity request associated with the second communication network to the server by using the service transmission of the circuit-switched domain within the first communication network, and receive the user identity information from the server by using the service transmission of the circuit-switched domain within the first communication network.

18. The user terminal of claim 14, wherein the control module is further configured to:
   operatively control the second communication module to send a registration request to the second communication network based on the user identity information;
   operatively control the second communication module to receive an authentication request from the second communication network and send the authentication request to the first communication module;
   operatively control the first communication module to send the authentication request to the server and acquire authentication information from the server using the service transmission of the circuit-switched domain within the first communication network; and
   operatively control the second communication module to receive the authentication information from the first communication module and send the authentication information to the second communication network for use in establishing the localized connection between the user terminal and the second communication network.

19. The user terminal of claim 13, wherein the control module is further configured to operatively control the first communication module to disable service transmissions in a circuit-switched domain within the first communication network prior to registering with the second communication network based on the obtained user identity information.

20. A computer program product comprising a computer readable storage medium that is not a transitory signal and that stores code executable by a processor, the executable code comprising code to perform:
   detecting a user terminal located at a roaming location, the roaming location comprising a location that is different from a home location where the user terminal is originally registered for use, the home location comprising a first communication network and the roaming location comprising a second communication network different from the first communication network;
   in response to detecting the user terminal located at the roaming location, obtaining, at the user terminal, user identity information by connecting the user terminal to a third communication network at the roaming location, the third communication network different from the first and second communication networks and communicatively coupled to the first communication network, the third communication network configured to transmit unstructured supplementary service data ("USSD") information between the user terminal and the first communication network, the USSD information comprising the user identity information;
   registering the user identity information with the second communication network of the roaming location; and
   establishing a localized connection between the user terminal and the second communication network based on the registered user identity information.

* * * * *